United States Patent [19]
Stephens et al.

[11] Patent Number: 5,955,523
[45] Date of Patent: *Sep. 21, 1999

[54] POLYOXALKYLENATED DISAZO COLORED THERMOPLASTIC RESINS

[75] Inventors: Eric B. Stephens, Roebuck; Mark E. Ragsdale, Duncan, both of S.C.

[73] Assignee: Milliken Research Corporation, Spartanburg, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/966,160

[22] Filed: Nov. 7, 1997

[51] Int. Cl.⁶ .................... C08J 3/20; D06P 3/26; D06P 3/52; D06P 3/60; D06P 3/79
[52] U.S. Cl. .................. 524/167; 524/190; 524/583; 524/585; 534/729; 8/403; 8/508; 8/509; 8/512; 8/513; 8/514; 8/518; 8/576; 8/647
[58] Field of Search ................ 8/403, 506–518, 8/576, 687, 647; 524/190, 167, 583, 585; 534/729

[56] References Cited

U.S. PATENT DOCUMENTS

| | | | |
|---|---|---|---|
| 4,640,690 | 2/1987 | Baumgartner et al. | 8/506 |
| 4,732,570 | 3/1988 | Baumgartner et al. | 8/506 |
| 4,812,141 | 3/1989 | Baumgartner et al. | 8/506 |
| 4,946,509 | 8/1990 | Schwartz et al. | 106/496 |
| 4,978,362 | 12/1990 | Kluger et al. | 18/506 |
| 5,591,833 | 1/1997 | Hines et al. . | |
| 5,766,268 | 6/1998 | Bruhnke | 8/647 |

*Primary Examiner*—Margaret Einsmann
*Attorney, Agent, or Firm*—Terry T. Moyer; Williams S. Parks

[57] ABSTRACT

Disazo chromphores having at least two different poly(oxyalkylene) substituents are linked together by a covalent bond or by an intervening connecting group to form dimers. The preferred poly(oxyalkylene) substituents are straight chain polymers consisting of ethylene oxide and propylene oxide. The disazo colorants are useful for coloring thermoplastic resins such as polypropylene and polyethylene and show improved extraction, migration, clarity and thermal stability characteristics as compared to standard monoazo colorants.

20 Claims, No Drawings

POLYOXALKYLENATED DISAZO COLORED THERMOPLASTIC RESINS

FIELD OF THE INVENTION

This invention relates to a colored thermoplastic resin composition and to a process for preparing such compositions. More particularly, the present invention relates to a thermoplastic resin composition that has been colored by disazo chromophores having two or more poly(oxyalkylene) substituents, preferably both ethylene and propylene oxide. The materials are particularly useful as colorants for thermoplastic resins such as polypropylene and polyethylene and show improved extraction and haze characteristics over the prior art.

Such poly(oxyalkylenated) azo chromophores provide substantial tinctorial power for thermoplastic resins per se or polymer-containing compositions. Some of the other desired physical and chemical characteristics of such colorants in relation to thermoplastic resins include:

—resistance to migration
—low extraction
—excellent clarity and lightfastness
—high heat (thermal) stability
—improved color utilization throughout the product
—availability as liquids at processing temperatures facilitating blending with the polymer composition
—ease in cleanup from processing
—homogeneity of dispersal in the polymer or composition
—non-nucleating propensity of the colorant
—and other manufacturing advantages.

Furthermore, these substituted colorants substantially prevent settling within, streaking within, subliming from, blooming from, and solvent or water extraction from the polymer composition or article formed therefrom.

BACKGROUND OF THE PRIOR ART

The use of poly(oxyalkylene) colorants in thermoplastic resins is known and may be found 10 in the following U.S. Pat. Nos.: 4,978,362 to Kluger et al., 4,812,141 to Baumgartner et al., 4,732,570 to Baumgartner et al., and 4,640,690 to Baumgartner et al. The prior art also shows that poly (oxyalkylene) colorants with higher percentages of the more hydrophlic oxyethylene groups in the polymer chain show reduced extraction levels compared to similar chromophores with high percentages of the more hydrophobic oxypropylene groups. While the colorants with high percentages of oxyethylene groups in the polymer chain show reduced extraction levels, they exhibit lower thermal stability, decreased clarity, and increased difficulty in manufacturing than colorants predominantly substituted with oxypropylene groups. In addition, the prior art references neither teach nor fairly suggest the use of disazo colorants with high percentages of oxypropylene groups, either alone or in random or block copolymers with other poly(oxyalkylene) species, in the polymer side chains for the in situ coloration of thermoplastic resins for reduced extraction, improved clarity, and better stability.

Objects of the Invention

Therefore, an object of the invention is to provide a process for coloring thermoplastic resins which comprises incorporating into thermoplastic resin a minor and effective amount of a colorant in the form of a poly(oxyalkylene) substituted disazo chromophore group, substituted with two or more different poly(oxyalkylene) groups. Another object is to improve the clarity and thermal stability of the colored thermoplastic resin while maintaining low migration or extraction levels. Furthermore, it is a further object of the invention to provide a poly(oxyalkylene) substituted polymeric colorant which is easily dispersible and lightfast within a thermoplastic resin.

SUMMARY OF THE INVENTION

According to the present invention, novel colorants useful herein are disazos formed by linking together azo chromophores, both of which are poly(oxyalkylene) substituted. A large and diverse number of azo chromophores are known in the art and may be adapted for use herein. Particularly useful are disazo chromophores characterized by the formula $R_1$—N=N—$R_2$ where $R_1$ and $R_2$ are aryl. Both $R_1$ and $R_2$ may be substituted. Suitable substituents for $R_1$ and $R_2$ are $C_1$–$C_4$ alkyl, $C_1$–$C_4$ alkoxy, halogen, hydroxyl, $SO_3H$, $SO_3Na$, $CO_2H$, CN, $NR_2$, thiol, amide, sulfoxamide, $C_1$–$C_8$ alkyl or aryl carbonyl, halogenated $C_1$–$C_4$ alkyl, aryl, or fused aryl groups.

The azo chromophores are linked together to form a disazo compound by a covalently bonded connecting group. Examples of suitable connecting groups between the two chromophores are O, S, $CO_2$, $SO_2$, a $C_1$–$C_8$ saturated alkyl group, a $C_2$ alkene group, p-phenylenediamine (where A=benzene, $R_1$=$NH_2$, and x=1 below), m-dihydroxybenzene, and m-di($C_1$–$C_3$)alkoxybenzene.

The disazo chromophores may be shown by the formula:

wherein $R_1$ and $R_2$ have the values described above, x is 0 or 1, and A is the connecting group for the dimer. The only instance in which x will be 0 is where A is m-dihydroxybenzene or a m-di($C_1$–$C_3$)alkoxybenzene since the azo groups will bond directly to the benzene ring.

In a preferred embodiment, $R_2$ is a derivative of a primary aromatic amine of the structure represented below:

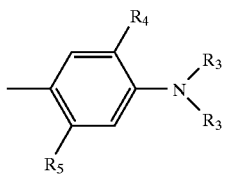

$R_3$ may be selected from poly($C_1$–$C_4$)alkylene oxide, copolymers of poly($C_1$–$C_4$)alkylene oxides, and hydroxy ($C_1$–$C_4$)alkylenes. The $R_4$ and $R_5$ moieties may be selected from hydrogen, $C_1$–$C_4$ alkyl, oxy($C_1$–$C_4$)alkyl, oxyaryl, amido($C_1$–$C_4$)alkyl, amidoaryl, amidodi($C_1$–$C_4$)alkyl, amidodiaryl, halogen, thio($C_1$–$C_4$)alkyl, thioaryl, and perfluoro($C_1$–$C_4$)alkyl. The $R_2$ group may be prepared by reacting a primary aromatic amine with an appropriate amount of an alkylene oxide or mixtures of alkylene oxides. In this regard, polyalkylene oxides and co-polymers of the same which may be employed to provide the colorant of the present invention are, without limitation, polyethylene oxides, polypropylene oxides, polybutylene oxides, copolymers of polyethylene oxides, polypropylene oxides, and polybutylene oxides, and other copolymers including block copolymers. Further, these substituents generally have an average molecular weight in the range of from about 88 to 2500, preferably from about 88 to about 1400, although lower and higher molecular weights are suitable, also.

Colorants according to the present invention are generally liquid at ambient conditions of temperature and pressure. However, if they are not liquid under such conditions they are still generally soluble in the reactants or within the processes in which they are employed.

DETAILED DESCRIPTION OF THE INVENTION

Without limiting the scope of the invention, the preferred embodiments and features are hereinafter set forth. Unless otherwise indicated, all parts and percentages are by weight and the conditions are ambient, i.e. one atmosphere of pressure at 25° C. The term aromatic compounds means single and fused double unsaturated hydrocarbon rings as well as unsaturated heterocyclic compounds containing from 1 to 3 hetero atoms selected from S, N, and O, which optionally may be benzo-fused. Unless otherwise specified, aliphatic hydrocarbons are from 1 to 12 carbon atoms in length, and cycloaliphatic hydrocarbons comprise from 3 to 8 carbon atoms. The terms aryl and arylene are intended to be limited to single ring and fused double ring unsaturated hydrocarbons.

All of the United States patents cited in the specification are hereby incorporated by reference.

The disazo colorants of the present invention are characterized by two azo radicals covalently bonded to two aromatic groups. The azo radicals may share a bifunctional aromatic group or they may be bonded to separate aromatic groups which are linked together and which form the interior of the disazo chain. Opposite the interior of the disazo chain, each of the azo radicals is bonded to an aromatic group, which together are designated the outer aromatic groups.

The disazo colorants include (1) primary disazo colorants, such as symmetrical and unsymmetrical compounds from a tetrazo component, and symmetrical and unsymmetrical compounds with a bifunctional coupling component; (2) secondary disazo colorants, such as compounds made by diazotizing an aminoazo compound, where the amino group is derived from a first coupling component, followed by coupling to a second coupling component; and (3) disazo colorants made by combining separate conjugated azo systems into a single molecule, such as by condensing aminoazo compounds with phosgene, cyanuric chloride or filmaryl dichloride.

When the interior of the disazo colorant is comprised of separate aromatic groups, the aromatic groups may be linked together by a covalent bond or a divalent group. Examples of suitable divalent linking groups include: O, S, $CO_2$, $SO_2$, $C_{1-8}$, alkylene, $C_{2-8}$ alkenylene, carbonyl, triazine, —C(O) CH=CH—C(O)—, phenylene, —C(O)NH—, and —NHC (O)NH—. Additionally, divalent linking groups in the disazo colorants of the present invention are exemplified in the "Colour Index", 3rd Edition, Volume 4, C.I. Numbers 20000–29999, pp 4139–4276 (1971).

The disazo colorants further have at least one poly (oxyalkylene) substituent bonded to each end on the colorants, preferably to the outer aromatic groups. The number of poly(oxyalkylene) substituents may vary from 1 to 6 per aromatic group, preferably from 1 to 4.

The poly(oxyalkylene) substituent may be characterized as a straight or branched chain of from 2 to 200 residues of $C_2$–$C_4$ alkylene oxides, preferably ethylene oxide and propylene oxide residues. Minor amounts of glycidol, butylene oxide, and other compatible monomers may also be incorporated into the substituent. In a preferred embodiment, each poly(oxyalkylene) substituent chain is primarily comprised of from 2 to 75, preferably 4 to 35, and most preferably 9, residues of ethylene oxide and propylene oxide or random and block copolymers thereof while the percentage of propylene oxide in the poly(oxyalkylene) substituent is from 20–80% (about 80–20% ethylene oxide), preferably about 40–60% (about 60–40% ethylene oxide), and most preferably about 55–56% (about 44–45% ethylene oxide). The preferred distribution of the ethylene oxide (EO) and propylene oxide (PO) moieties ranges from 2–15 EO and 2–20 PO. Highly preferred is a range of distribution of 6–10 EO and 6–10 PO. Most preferred is a distribution range of 8–10 EO and 10 PO. Particular preferred compounds are exemplified and discussed more extensively below.

The poly(oxyalkylene) substituent is provided with a nucleophilic terminal group. Those with skill in the art will recognize that the identity of the group may be varied depending on the monomer employed.

The poly(oxyalkylene) substituent may be covalently bonded to the disazo colorant by a suitable divalent or trivalent group, for example, N, NR, O, S, $S_2$, $SO_2N$, $SO_2NR$, $CO_2$, CON, or CONR, where R is H, $C_1$–$C_{12}$ alkyl, phenyl, or benzyl. Preferably, the linking group is N, NR, O, $SO_2N$, or $SO_2NR$. Two poly(oxyalkylene) substituents may be bonded to the disazo colorant through a trivalent linking group.

The aromatic compounds useful in the invention include phenyl, naphthyl, and heterocyclic compounds containing from 1 to 3 hetero atoms selected from the group consisting essentially of S, N, and O, which optionally may be benzo-fused. By way of further example, heterocyclic compounds based upon the following structures may be employed: thiazoles, benzothiazoles, thiadiazoles, isothiazoles, isoxazoles, benzothiazoles, thienes, pyridines, pyrazoles, triazoles, phthalimides, pyrroles, indoles, pyrimidines, thiophenes, and furnanones. Preferably, all of the aromatic groups comprising the disazo colorant are selected form phenyl, phenylene, naphthyl, and naphthalene groups.

In addition to the poly(oxyalkylene) substituent, the aromatic groups of the disazo colorant may be substituted with form 1 to 4 substituent groups, such as $C_1$–$C_4$ alkyl or aryl, where R is H, $C_1$–$C_8$ alkyl or aryl. Suitable substituent groups are also exemplified in the "Color Index", 3rd Edition, Volume 4, C.I. Numbers 20000–29999, pp 4139–4276 (1971).

PREFERRED EMBODIMENTS OF THE INVENTION

Examples of particularly preferred compounds within the scope of the present invention are set forth below:

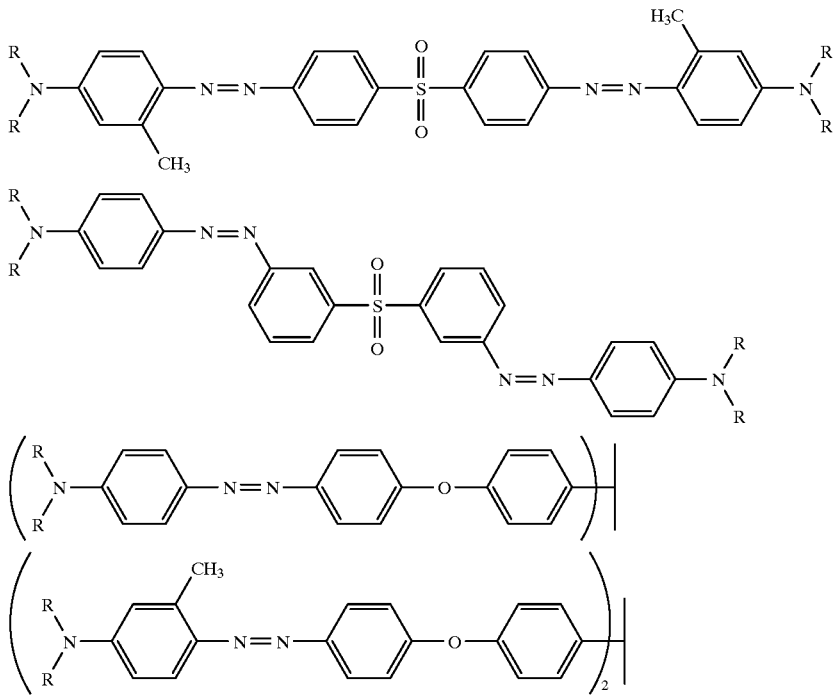

Where R = $(C_2H_4O)(C_3H_6O)_5(C_2H_4O)_3$

The disazo colorants may be synthesized using procedures well known in the art for synthesizing disazo dyes, except that a poly(oxyalkylene) substituted coupling component or a poly(oxyalkylene) substituted disazo component is employed. Suitable synthesis routes may be found in U.S. Pat. Nos. 5,108,460 to Hines et al. and 5,290,921 to Moody et al., as well as the following examples. The terms "EO" and "PO" refer to ethylene oxide and propylene oxide residues, respectively.

EXAMPLE 1

To a stirring solution of water (23.0 g), 93% sulfuric acid (35.0 g), and 2-ethylhexanol (0.2 g) was added at room temperature 4,4'-diaminodiphenylsulfone (10.8 g). The resulting reaction mixture was stirred for 10 min. then cooled to 0–5C. Nitrosylsulfuric acid (40%, 31.0 g) was slowly added while maintaining temperature <10 C. After stirring for 1 hour, the mixture was tested for excess nitrite. A positive nitrite test was obtained. The ensuing bis diazonium salt solution was then slowly added into a mixture of m-toluidine 2EO 10PO 6EO (89.8 g), water (45.0 g), and urea (2.0 g) at 0–10 C. The ensuing red reaction mixture was allowed to stir overnight after which 50% caustic (60 g) was added to adjust the pH to greater than 7. The resulting product layer was separated, washed several times with hot water and stripped via rotary evaporator to give an orange oil with a maximum absorbance (in MeOH) at 471 nm.

EXAMPLE 2

To a stirring solution of water (12.2 g) and acetic acid (90.1 g) was added at room temperature 2,2'-bis[4-(4-aminophenoxy) phenyl] propane (BAPP) (24.8 g). The resulting solution was stirred until all the BAPP was dissolved. Muriatic acid (15.0 g) was then added. The solution was then cooled to 0–5 C and a solution of sodium nitrite (9.2 g) in water (24 g) was added while maintaining the temperature <5 C. After stirring for 1 hour, the mixture was tested for excess nitrite. A positive nitrite test was obtained. Sulfamic acid (4.3) was then added to remove residual nitrite. The ensuing bis diazonium salt solution was then slowly added into a mixture of m-toluidine 2EO 10PO 6EO (127 g) and water (90.2 g) at 0–10 C. The ensuing violet reaction mixture was allowed to stir for 1 hour after which 50% caustic (97 g) was added to adjust the pH to greater than 7. The resulting product layer was separated, washed several times with hot water and stripped via rotary evaporator to give a yellow/orange oil with a maximum absorbance (in MeOH) at 419 nm.

EXAMPLE 3

The procedure of example 3 was followed with the exception of amounts of reactions and the particular diamine and coupler employed, all of which are specified below.

| | |
|---|---|
| Water | 12 grams |
| Acetic Acid | 90 grams |
| BAPP | 24.8 grams |
| Muriatic Acid | 15 grams |
| Sodium Nitrite | 18 grams |
| Water | 24 grams |
| Sulfamic Acid | 12 grams |
| Aniline 2EO/10PO/6EO | 130.5 grams |
| Water | 90 grams |
| 50% Caustic | 101.7 grams |

The resultant product was a yellow/orange oil having a maximum absorbance (in MeOH) at 414 nm.

EXAMPLE 4

The procedure of example 1 was followed with the exception of amounts of reactions and the particular diamine and coupler employed, all of which are specified below.

| | |
|---|---|
| Water | 27.6 grams |
| Sulfuric Acid | 33.2 grams |
| 3,3'-diaminodiphenylsulfone | 10.3 grams |
| Nitrosylsulfuric Acid | 30.5 grams |
| Sulfamic Acid | 3.8 grams |
| Aniline 2EO/10PO/6EO | 85.8 grams |
| Water | 90.3 grams |
| 50% Caustic | 73 grams |

A yellow/orange oil resulted with a maximum absorbance (in MeOH) at 435 nm.

Polymer Resins

Thermoplastic resins which may be used according to the present invention include a wide range of synthetic resins and synthetic resin compositions which are known as being essentially thermoplastic in nature. The term "thermoplastic" is used herein in its conventional sense to mean a resin "having the property of softening or fusing when heated and of hardening again when cooled" (see Webster's Seventh Collegiate Dictionary, G & C Merriam Co., 1965). Thermoplastic resins are to be clearly distinguished both in terms of their essential physical and chemical characteristics from thermosetting resins. The term "thermosetting" as used herein is also used in its conventional sense to mean a resin "having the property of becoming permanently rigid when heated or cured."

Examples of thermoplastic resin systems which may be employed include a wide range of polyolefin polymers, e.g. polyethylene, linear low density polyethylene, polypropylene, polybutylene, and copolymers made from ethylene, propylene, polybutylene, and mixtures thereof. Other thermoplastic polymers which may be employed according to the present invention include polyvinyl chloride, polyvinylidene chloride, cellulosic resins such as cellulose acetate, cellulose acetate, cellulose acetate butyrate, and cellulose acetate propionate, acrylic resins such as polymethylmethacrylate, styrene acrylonitrile, polystyrene, polycarbonate, and acrylonitrile-butadiene-styrene (herein ABS), polyamides such as nylon 6 and nylon 66, and polyesters such as polyethylene terephthalate, especially glycol modified polyethylene terephthalate and polybutylene terephthalate. These thermoplastic resins may be used in any number of applications, including, but not limited to, plastic storage receptacles, molding articles, thermoplastic resin-containing inks, and so on.

The thermoplastic resins of this invention differ from the resins described in copending application 08/733,862. The currently contemplated thermoplastic resins comprise a solid polymeric article at ambient temperature. The poly (oxyalkylene) substituted colorants are added to the resin composition during, as merely an example, the extrusion process. In the copending application, the resins are primarily urethane-based and thus are not solid at ambient temperature. Furthermore, all of the resins, including the polyesters, of the copending application are colored through the addition of the poly(oxyalkylene) substituted polymeric colorants to the individual monomers prior to polymerization. Such differences in coloring procedures are highly significant.

According to the process of the invention, the colorant may be incorporated into the thermoplastic resin using conventional techniques such as those employed to incorporate other additives in such resins. For instance, the colorant may be incorporated into the resin by simply adding it to the resin while the resin is in a plasticized or molten state, typically prior to formation of the polymer into its final state, e.g. by molding, extrusion, blow-molding, and the like. For instance, when the thermoplastic resin to be colored is a polyolefin resin the process may be carried out by adding a colorant comprised of a polyalkyleneoxy-substituted chromophore group directly to the molten polymer, by tumbling it onto a pre-extruded pellitized resin, or by mixing it into the resin powder prior to extrusion. The polymer may then be molded or extruded in the usual manner, i.e. in the same way as for polyolefin resins which are not colored. Details about these procedures may be found in the relevant literature.

Alternatively, a concentrate of the colorant in an appropriate resin or vehicle may first be prepared. Such concentrate may contain an appropriately high percentage of colorant. The concentrates may be in the form of liquids, solids, e.g. powders, pellets, etc., as may be desired. These concentrates may then be incorporated in to the thermoplastic resin as is well understood in the art.

The disazo colorants described herein exhibit low extraction or migration levels, similar to monoazo colorants with predominantly oxyethylene polymer side chains. However, unlike the monoazo colorants with predominantly ethyleneoxy polymer side chains, the disazo colorants have the advantage of reduced migration, decreased extraction levels, greater thermal stability, and better clarity within such thermoplastic resins.

Tests for Extraction and Haze

EXAMPLE 5A

Tests were conducted to determine the extractability and clarity of disazo colorants prepared according to examples 1 through 3 versus similar monoazo polymeric colorants with predominantly ethyleneoxy side chains and predominantly propyleneoxy side chains. The following procedure was followed. First, the color value for each colorant tested was determined by placing about 0.15–0.20 grams of colorant into a 100 mL volumetric flask and adding approximately 40–50 mL of methanol. The flask was swirled until the colorant dissolved in the methanol. Excess methanol was then added to the 100 mL mark on the flask. The flask was stoppered and the contents were mixed and shaken. Exactly 2.0 mL of the solution of the colorant in methanol was then added to a separate 100 mL flask and the flask was filled with methanol to the 100 mL mark, and then was stoppered and shaken.

The color value is obtained by multiplying the sample weight by 0.2 and dividing the product obtained into the maximum ultraviolet absorbance value. A Beckman DU-650 Spectrophotometer was calibrated to zero with methanol and filled with the test solution. Scanning was performed from 300 to 750 mm and the maximum absorbance was recorded.

In order to correct for varying color strengths, the colorants which were compared were all cut to a consistent color strength with a polyester polyol diluent (Polyethylene glycol 400 NF or PEG 400). This was accomplished by taking a known amount of colorant with a known color value. The amount of diluent added was determined as follows:

[(Uncut CV/Desired Cut CV)–1](Wgt. of uncut color)=Wgt. of PEG 400 added

For the extraction test, all colorants were loaded into the polyolefin resins at 4000 ppm (4% by weight). The polypropylene random copolymer resin used in the extraction study was Fina 7525 while the low density polyethylene resin used was Quantum NA 860008. The general procedure for making test plaques for extraction testing was as follows:

The proper weight of colorant was added to 100 grams of the pelletized polyolefin resin. The mixture was then mixed 3 minutes on a laboratory Hobart mixer to insure uniform colorant 2 0 distribution over the surface of the pellets. The samples were then extruded on a laboratory MPM single screw extruder at 325° F. (about 162.8° C). The resulting colored pellets were then injection molded at 200° C. on an Arburg 25-ton molder into plaques measuring 2"×3"×0.05". Background plaques were made by extruding and molding uncolored resin using the same conditions as were used for the colored sample preparation.

These plaques were then placed into stainless steel dye kettles which had Teflon® lined tops. The total volume of the container was 200 mL. It required 125 mL to cover the plaques. One plaque was placed in each stainless steel pressure vessel. Then added into the extraction vessel was 125 mL of the extraction solvent (15% Ethanol in distilled water) which had been preheated to 70° C. The vessel was screwed closed and placed in an oven heated to 70° C. for two hours. The plaques were then removed from the extraction solutions. The amount of color that extracted from the plaques was then determined by measuring the absorbance of the extracting solution in a 10 cm cell on a Beckman DU-650 Spectrophotometer using the extraction solution from the uncolored plaques as the background. The extraction results as well as %Haze measurements are summarized in Table 1 below.

TABLE 1

Disazo Colorant

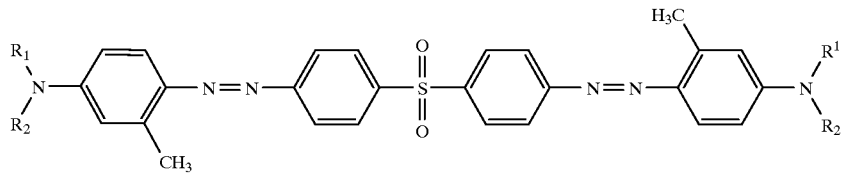

| Run # | $R_1R_2$ | Polymer Resin | Extraction Absorbance | % Haze** |
|---|---|---|---|---|
| 5A-1 | 2EO/10PO/6EO | PP Random Copolymer | 0.00 | 55.6 |
| 5A-2 | 2EO/10PO/6EO | Low Density Polyethylene | 0.01 | ** |

**% Haze measurements were taken on a Gardner Hazemeter. All measurements were performed on colorants in polypropylene random copolymer (Fina 7525) plaques at a color loading of 4000 ppm.

EXAMPLE 5B (Comparative)

The procedure of Example 5A was repeated, except that the disazo colorant of the present invention was replaced by an orange chromophore corresponding to U.S. Pat. No. 4,284,729 to Cross et al. The structure of the colorant and the results are shown in Table 2.

TABLE 2

Monoazo Colorant

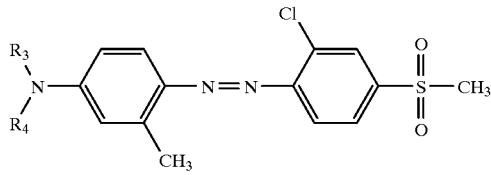

| Run # | $R_3R_4$ | Polymer Resin | Extraction Absorbance | % Haze** |
|---|---|---|---|---|
| 5B-1 | 2E0/10PO/6EO | PP Random Copolymer | 0.02 | 35.6 |
| 5B-2 | 2E0/10PO/6EO | Low Density Polyethylene | 0.08 | ** |
| 5B-3 | 27E0 | PP Random Copolymer | 0.01 | 61.7 |
| 5B-4 | 27E0 | Low Density Polyethylene | 0.02 | ** |

**% Haze measurements were taken on a Gardner Hazemeter. All measurements were performed on colorants in polypropylene random copolymer (Fina 7525) plaques at a color loading of 4000 ppm.

EXAMPLE 6A

Example 5A was repeated except that the disazo yellow colorants shown in Table 3 below were used.

TABLE 3

Disazo Colorant

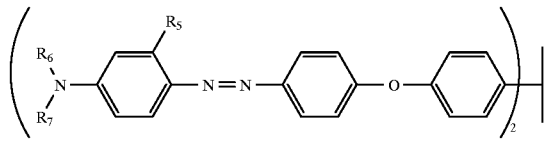

| Run # | $R_5$ | $R_6R_7$ | Polymer Resin | Extraction Absorbance | % Haze** |
|---|---|---|---|---|---|
| 6A-1 | H | 2EO/10PO/6EO | PP Random Copolymer | 0.00 | 41.6 |
| 6A-2 | H | 2EO/10PO/6EO | Low Density Polyethylene | 0.01 | ** |
| 6A-3 | $CH_3$ | 2EO/10PO/6EO | PP Random Copolymer | 0.00 | 34.7 |
| 6A-4 | $CH_3$ | 2EO/10PO/6EO | Low Density Polyethylene | 0.00 | ** |

**% Haze measurements were taken on a Gardner Hazemeter. All measurements were performed on colorants in polypropylene random copolymer (Fina 7525) plaques at a color loading of 4000 ppm.

EXAMPLE 6B (Comparative)

Example 5B was repeated except that the yellow monoazo colorants shown in Table 4 below were used.

TABLE 4

Monoazo Colorant

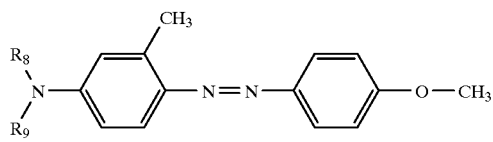

| Run # | $R_8R_9$ | Polymer Resin | Extraction Absorbance | % Haze** |
|---|---|---|---|---|
| 6B-1 | 2EO/10PO/6EO | PP Random Copolymer | 0.06 | 23.2 |
| 6B-2 | 2EO/10PO/6EO | Low Density Polyethylene | 0.30 | ** |
| 6B-3 | 27EO | PP Random Copolymer | 0.01 | 36.4 |
| 6B-4 | 27EO | Low Density Polyethylene | 0.02 | ** |

**% Haze measurements were taken on a Gardner Hazemeter. All measurements were performed on colorants in polypropylene random copolymer (Fina 7525) plaques at a color loading of 4000 ppm.

The results of Examples 5–6 demonstrate that the disazo colorants of the present invention show dramatically reduced extraction levels than similar monoazo colorants with high levels of propyleneoxy groups in the poly(oxyalkylene) polymer chain. The results also show that the disazo colorants of the present invention exhibit lower haze levels than similar monoazo colorants with high levels of hydrophilic ethyleneoxy groups.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A process for coloring a thermoplastic resin which comprises incorporating into said resin while said resin is in a molten state a poly(oxyalkylene) substituted disazo chromophore colorant having two or more different oxyalkylene substituents per poly(oxyalkylene) chain in a minor amount sufficient to provide colorant to said thermoplastic resin; wherein said disazo chromophore is represented by the formula (I)

$$R_2-N=N-[R_1]_x-A-[R_1]_x-N=N-R_2 \qquad (1)$$

wherein $R_1$ and $R_2$ may be the same or different and are selected from the group consisting of substituted aryl and unsubstituted aryl; wherein A is a linking group selected from the group consisting of O, S, $CO_2$, $SO_2$, $C_1$–$C_8$ saturated alkyl, $C_2$ alkene, p-phenylenediamine, m-hydroxybenzene, and m-di($C_1$–$C_4$)alkoxybenzene; and wherein x is 1, unless A is m-dihydroxybenzene or m-di($C_1$–$C_3$)alkoxybenzene, then x is 0;

wherein said oxyalkylene substituents are bonded to the $R_2$ groups of the disazo chromophore through a linking group selected from the group consisting of N, NR, O, S, $S_2$, $SO_2N$, $SO_2NR$, $CO_2$, CON, and CONR, wherein R is selected from the group consisting of H, $C_1$–$Cl_{21}$ alkyl, phenyl, and benzyl;

wherein said oxyalkylene substituents of said poly(oxyalkylene) substituted disazo chromophore are selected from the group consisting of polyethylene oxides, polypropylene oxides, polybutylene oxides, and any copolymers consisting thereof; and wherein each of said poly(oxyalkylene) chains has an average molecular weight from about 88 to about 2500.

2. The process of claim 1 wherein said resin is selected from the group consisting essentially of polyolefin polymers and copolymers, polystyrenes, polycarbonates, ABS, polyvinylchloride, polyvinylidene chloride, cellulosic resins, acrylic resins, polyamides, and polyesters.

3. The process of claim 2 wherein said resin is a polyolefin.

4. The process of claim 3 wherein said polyolefin is selected from the group consisting essentially of polyethylene, linear low density polyethylene, polypropylene, polybutylene, and copolymers of ethylene, propylene, butylene, and any mixtures thereof.

5. The process of claim 2 wherein said resin is selected from the group consisting essentially of polyvinylchloride and polyvinylidene chloride.

6. The process of claim 1 wherein the disazo colorant is selected from the group consisting essentially of compounds having the following structures:

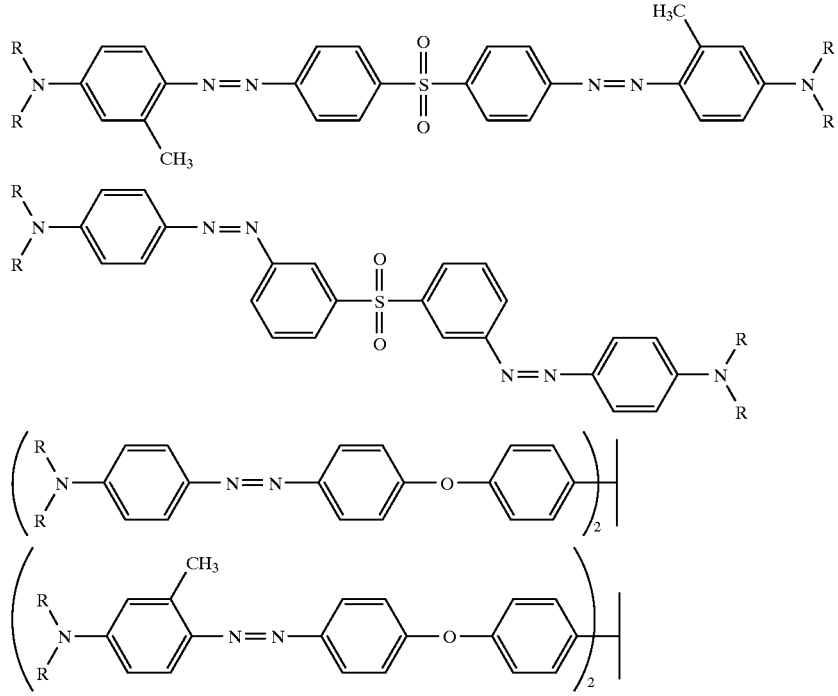

wherein R represents two or more different oxyalkylene substituents selected from the group consisting essentially of polyethylene oxides, polypropylene oxides, polybutylene oxides, and any copolymers consisting thereof.

7. The process of claim 1 wherein the poly(oxyalkylene) substituent is a random or block copolymer of ethylene oxide and propylene oxide.

8. The process of claim 7 wherein the poly(oxyalkylene) substituent is a random or block copolymer of ethylene oxide and propylene oxide of about 20–80% ethylene oxide and about 20–80% propylene oxide.

9. The process of claim 7 wherein the poly(oxyalkylene) substituent is a random or block copolymer of about 40–60% ethylene oxide and about 40–60% propylene oxide.

10. The process of claim 9 wherein the poly(oxyalkylene) substituent is a random or block copolymer of about 44–45% ethylene oxide and about 55–56% propylene oxide.

11. A colored thermoplastic resin comprising
a thermoplastic resin and
a poly(oxyalkylene) substituted disazo chromophore in a minor amount sufficient to provide coloration to said thermoplastic resin; wherein
said disazo chromophore is represented by the formula (I)

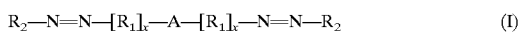

$$R_2-N=N-[R_1]_x-A-[R_1]_x-N=N-R_2 \quad (I)$$

wherein $R_1$ and $R_2$ may be the same or different and are selected from the group consisting of substituted aryl and unsubstituted aryl; wherein A is a linking group selected from the group consisting of O, S, $CO_2$, $SO_2$, $C_1$–$C_8$ saturated alkyl, $C_2$ alkene, p-phenylenediamine, m-hydroxybenzene, and m-di($C_1$–$C_4$)alkoxybenzene; and wherein x is 1, unless A is m-dihydroxybenzene or m-di($C_1$C3)alkoxybenzene, then x is 0;

wherein said oxyalkylene substituents are bonded to the $R_2$ groups of the disazo chromophore through a linking group selected from the group consisting of N, NR, O, S, $S_2$, $SO_2N$, $SO_2NR$, $CO_2$, CON, and CONR, wherein R is selected from the group consisting of H, $C_1$–$C_{12}$ alkyl, phenyl, and benzyl;

wherein said chromophore comprises two or more different oxyalkylene substituents per poly(oxyalkylene) chain selected from the group consisting of polyethylene oxides, polypropylene oxides, polybutylene oxides, and any copolymers consisting thereof; and wherein each of said poly(oxyalkylene) chains has an average molecular weight from about 88 to about 2500.

12. The colored resin of claim 11 wherein said resin is selected from the group consisting essentially of polyolefin polymers and copolymers, polystyrenes, polycarbonates, ABS, polyvinylchloride, polyvinylidene chloride, cellulosic resins, acrylic resins, polyamides, and polyesters.

13. The colored resin of claim 12 wherein said resin is a polyolefin.

14. The colored resin of claim 13 wherein said polyolefin is selected from the group consisting essentially of polyethylene, linear low density polyethylene, polypropylene, polybutylene, and copolymers of ethylene, propylene, butylene, and any mixtures thereof.

15. The colored resin of claim 12 wherein said resin is selected from the group consisting essentially of polyvinylchloride and polyvinylidene chloride.

16. The colored resin of claim 11 wherein the disazo colorant is selected from the group consisting essentially of compounds having the following structures:

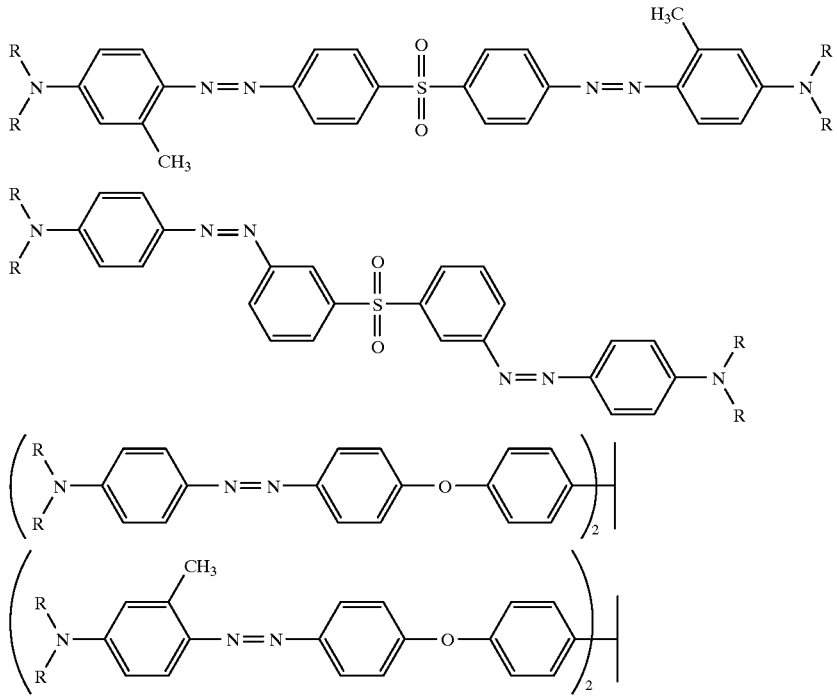

wherein R represents two or more different oxyalkylene substituents selected from the group consisting essentially of polyethylene oxides, polypropylene oxides, polybutylene oxides, and any copolymers consisting thereof.

17. The colored resin of claim 11 wherein the poly (oxyalkylene) substituent is a random or block copolymer of ethylene oxide and propylene oxide.

18. The colored resin of claim 17 wherein the poly (oxyalkylene) substituent is a random or block copolymer of ethylene and propylene oxide of 20–80% ethylene oxide and 80–20% propylene oxide.

19. The colored resin of claim 18 wherein the poly (oxyalkylene) substituent is a random or block copolymer of about 40–60% ethylene oxide and 60–40% propylene oxide.

20. The colored resin of claim 19 wherein the poly (oxyalkylene) substituent is a random or block copolymer of about 44–45% ethylene oxide and 55–56% propylene oxide.

* * * * *

UNITED STATES PATENT AND TRADEMARK OFFICE
CERTIFICATE OF CORRECTION

| | | |
|---|---|---|
| PATENT NO. | : 5,955,523 | Page 1 of 1 |
| APPLICATION NO. | : 08/966160 | |
| DATED | : September 21, 1999 | |
| INVENTOR(S) | : Eric B. Stephens and Mark E. Ragsdale | |

It is certified that error appears in the above-identified patent and that said Letters Patent is hereby corrected as shown below:

IN THE TITLE: Delete the word "POLYOXALKYLENATED" before DISAZO and insert -- POLYOXYALKYLENATED --

In column 14, line 13, delete "$(C_1C3)$" and insert -- $(C_1–C_3)$ --

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,955,523 | Page 1 of 1 |
| APPLICATION NO. | : 08/966160 | |
| DATED | : September 21, 1999 | |
| INVENTOR(S) | : Eric B. Stephens and Mark E. Ragsdale | |

It is certified that error appears in the above-identified patent and that said Letters Patent is hereby corrected as shown below:

Item [54] and Column 1, line 1

IN THE TITLE: Delete the word "POLYOXALKYLENATED" before "DISAZO" and insert -- POLYOXYALKYLENATED --

In column 14, line 13, delete "$(C_1C3)$" and insert -- $(C_1–C_3)$ --

This certificate supersedes the Certificate of Correction issued March 25, 2008.

Signed and Sealed this

Fifteenth Day of April, 2008

JON W. DUDAS
*Director of the United States Patent and Trademark Office*